United States Patent [19]

Ullrich et al.

[11] Patent Number: 4,617,089
[45] Date of Patent: Oct. 14, 1986

[54] APPARATUS FOR DISCHARGING HIGH VISCOSITY MEDIA IN CHEMICAL ENGINEERING

[75] Inventors: Martin Ullrich; Manfred Hederich; Frank Wingler, all of Leverkusen, Fed. Rep. of Germany

[73] Assignee: Bayer Aktiengesellschaft, Fed. Rep. of Germany

[21] Appl. No.: 713,615

[22] Filed: Mar. 19, 1985

Related U.S. Application Data

[63] Continuation of Ser. No. 483,546, Apr. 11, 1983, abandoned.

[30] Foreign Application Priority Data

Apr. 23, 1982 [DE] Fed. Rep. of Germany ....... 3215273

[51] Int. Cl.$^4$ .............................. B01D 1/00; B29B 7/48
[52] U.S. Cl. ..................................... 159/43.1; 159/2.2; 366/85; 366/89; 366/300; 366/301; 425/376 R; 422/137
[58] Field of Search .......................... 159/2.2, 2.3, 43.1, 159/47.1; 366/83, 84, 85, 186, 301, 89, 266, 300; 418/9, 10; 425/376 R; 422/133, 134, 135, 137, 229

[56] References Cited

U.S. PATENT DOCUMENTS

| | | | |
|---|---|---|---|
| 3,118,744 | 1/1964 | Erdmenger et al. | 159/2.2 |
| 3,395,746 | 8/1968 | Szabo et al. | 159/2.2 |
| 3,640,669 | 2/1972 | Hanslik | 425/376 R |
| 3,749,374 | 7/1973 | Buchheit | 366/84 |
| 3,809,140 | 5/1974 | Erdmenger et al. | 159/2.2 |
| 3,873,474 | 3/1975 | Ficker | 366/85 |

Primary Examiner—S. Leon Bashore
Assistant Examiner—Andrew J. Anderson
Attorney, Agent, or Firm—Connolly and Hutz

[57] ABSTRACT

The discharge apparatus comprises an at least four-shaft screw pump having engaging shafts (1,2,3,4) which rotate in opposite directions in pairs. The viscous product to be processed is caught up over a large area and removed by the screws. A double shaft screw pump is connected downstream of the actual collection zone as a pressure build-up zone. The two center screws (2, 3) of the collection zone merge equiaxially into the screw shafts (2a, 3a) of the pressure build-up zone. The collection zone and the pressure build-up zone are combined into one constructional unit. At least one screw shaft is driven. The resulting high viscosity product strands (7) are caught up by the screws in the collection zone and are moved on into the pressure build-up zone. The double shaft screw pump is used for the build up of a high operational pressure and thus provides the prerequisite for the subsequent connection of further procedural stages. The universal possibilities of use of this discharge apparatus are to be stressed in particular.

7 Claims, 4 Drawing Figures

APPARATUS FOR DISCHARGING HIGH VISCOSITY MEDIA IN CHEMICAL ENGINEERING

CROSS REFERENCE TO RELATED APPLICATIONS

This application is a continuation of application Ser. No. 483,546 Apr. 11, 1983 now abandoned.

This invention relates to an apparatus for discharging high viscosity media from evaporators or reactors by means of a multi-shaft screw pump.

Flash evaporators and spiral tube or winding tube evaporators are used in high viscosity technology and in polymer technology for concentrating high viscosity solutions. In a particularly economical method, i.e. in the case of substantial concentration, evaporators of this type have the problem of a controlled, reliable separation of the only slightly flowable, or of the no longer flowable, concentrate from very large quantities of steam at their outlet.

A similar problem arises in evaporation and degassing apparatus, in which the solution is formed into a plurality of free-falling strands, films or threads and is thus concentrated with a large surface in a vacuum chamber. The greater cross-sections of such degassing systems demand, according to the prior art, a sump at their lower end in which the concentrated melt collects under gravity and flows centrally towards a gear pump. Sensitive materials may suffer thermal damage in this creeping, laminar sump flow having a long residence time, a broad residence time distribution at a high temperature, and they may experience discolourations and may be partly decomposed, which results in an unusable product.

Apparatus comprising two pairs of screws which rotate in the same direction and are opened in a V shape [1], [2], [3], have the disadvantage of an expensive four shaft equi-rotation drive and a restricted absorbing power, because the substance is guided around the shafts in a figure of eight motion and thus re-emerges on the top with partial filling of the screw pitches. Furthermore, the equi-rotation system exerts increased shearing effects on the product.

In another apparatus [4], a flash chamber is provided for polymer solutions comprising a contra-rotating, profiled double roller as the discharge member and a contra-rotating, meshing double screw as the continuation of the two rollers. In addition to the restricted absorption width, the absent self-cleaning of the non-meshing double roller is a further disadvantage.

[5] describes a separating pump, formed from four obliquely toothed wheels in a V-shaped arrangement, for the flash evaporation of foamy, viscous solutions. All four wheels engage with each other in opposite directions, the lower wheels being tightly-meshing and self-cleaning and the upper wheels having intentionally large gaps for receiving the product. The apparatus has two product inlets which are not in the open steam chamber, but are closed in the region of the upper toothed wheels, and has a lower concentrate outlet. The direction of rotation and the tooth geometry are devised such that the material moves in an S shape in each case around two toothed wheels between the inlet and the outlet. The apparatus is not developed for types of evaporator having free-falling threads etc, but is only designed for flash distillations. A criticism of the apparatus is the lack of self-cleaning of the upper wheels, the small conveyed quantity caused by the unusual, S-shaped transporting principle through reduced tooth widths and therefore, the necessary high, shearing-intensive speeds.

An object of the present invention is to provide for all the above-mentioned types of evaporator of high viscosity and polymer technology, suitable forcefeeding, operatively-reliable, product-protecting and financially favourable collecting and discharging apparatus based on a multi-shaft screw pump.

This object is achieved according to the present invention in that the screw pump comprises at least four shafts which engage with each other and which rotate in opposite directions in pairs, downstream of which is connected a double-shaft screw pump as the pressure build-up zone, the two centre screw shafts merging equiaxially into the screw shafts of the pressure build-up zone.

In one embodiment, the screw shafts form a V-shaped collecting tank. In another embodiment, they all lie in one plane.

The pump preferably comprises four screw shafts, the two outer screw shafts being positioned symmetrically to the two centre screw shafts.

A further development is characterised in that in the region of the collection zone, the diameter of and the spacing between the two centre screw shafts is selected large enough so that these shafts do not engage, and only the outer shafts engage with the centre shafts, and in the region of the pressure build-up zone, the centre shafts are continued as engaging contra-rotating screws having a greater diameter.

The drive of the pump may be designed such that either only one screw shaft is driven, or the two centre screw shafts are driven, or all the screw shafts are driven.

The following advantages are provided by the present invention:

1. The discharge apparatus is self-cleaning due to the tightly-meshing transport elements.
2. The discharge geometry according to the present invention demands a high absorbing power (absorption capacity) for the concentrate. The concentrate is continuously transported away on the lower side of the shafts and new, absorption-ready empty spaces are prepared on the upper side.
3. The discharge apparatus may be easily combined with all initially mentioned types of evaporator.
4. A low-shearing and product-protecting discharge takes place. This means that the product is not exposed to any unnecessary mechanical strains while it is being discharged.
5. The flow of concentrate issuing from the evaporator is divided into several partial flows and decomposed by the top, outwardly rotating shafts. This entails an even better degassing and evaporation, because enclosed vapour bubbles may be released.
6. An expensive drive technique is unnecessary due to the universal opposite rotation of the screws. In the simplest case, a single driving shaft is sufficient.
7. The apparatus combines a very large "absorptive", force-feeding separating chamber with a high intensity pressure build-up section joining thereto.

Thus, the new discharge apparatus is an important constructional element in solving the problem at critical transition points between different procedural stages in high viscosity technology.

Embodiments of the present invention will be described in more detail in the following with reference to the drawings, wherein.

Figure 1:
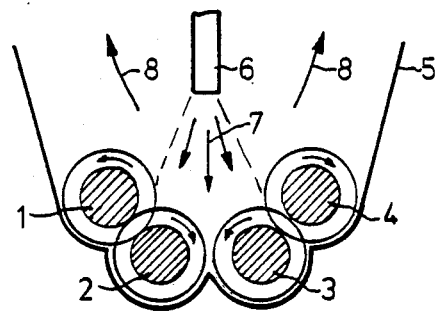
FIG. 1 illustrates a discharge apparatus, comprising screw shafts arranged in a V shape.

According to FIG. 1, four screw shafts 1, 2, 3, 4 are positioned in the bottom zone of a V-shaped collection tank 5 such that the axes of the two lower screw shafts 2, 3 are at the same height and the axes of the two upper screw shafts 1 and 4 are at the same height. The direction of rotation of one screw shaft is always opposite that of the adjacent shafts. The drawing indicates that the screws 1 and 2 and the screws 3 and 4 engage with each other, while a gap remains between the screws 2 and 3. This means that these two screw shafts do not engage. The viscous concentrate 7 issuing from the outlet 6 of the evaporator is taken up by the screw shafts 1 to 4 and transported away in an axial direction. The steam (indicated by reference numeral 8) which is released at the same time may flow away upwards.

Figure 2:
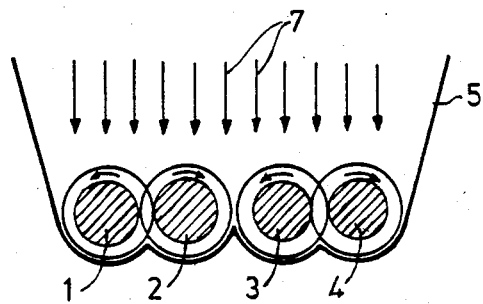
FIG. 2 illustrates a discharge apparatus, in which the screw shafts are arranged in one plane.

FIG. 2 illustrates the planar version of the discharge apparatus. In this Figure, all four screw shafts lie in one plane and form a self-cleaning and force-feeding discharge surface which has the maximum possible width. This version may be used when a plurality of smoothly flowing concentrate strands, free-falling films, strings or threads are produced at the evaporator outlet. Such a case applies, for example, at the outlet of multiple flash evaporators or in "effervescent" residual degassers. By means of the new discharge apparatus, such apparatus may now also be operated within viscosity ranges which were previously closed to them.

Figure 3:
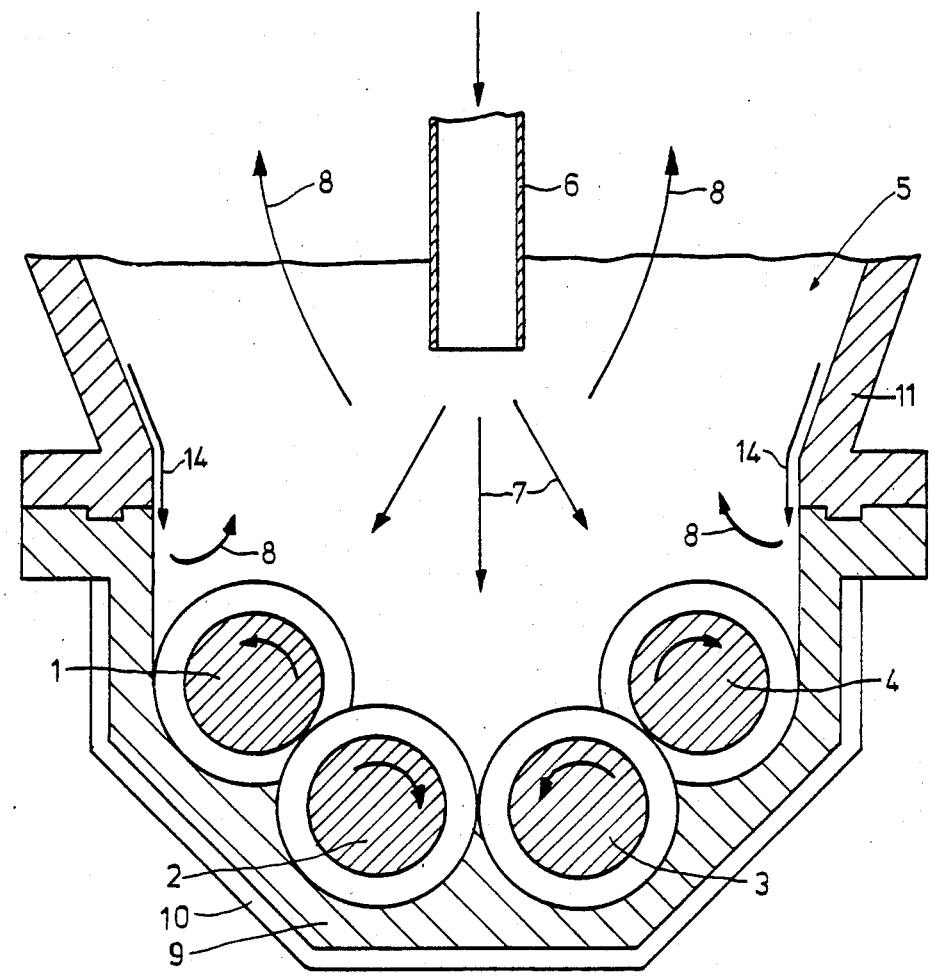
FIG. 3 illustrates a detailed view of the discharge apparatus having a V-shaped arrangement of the screw shafts.

The collecting apparatus based on the V-shaped arrangement of the screw shafts will now be described again in detail with reference to FIG. 3 (cross section) and FIG. 4 (top view). The V-shaped collection tank formed from the screw shafts 1 to 4 may be varied, with respect to its opening angle, within a fairly wide range. Thus, for example, an opening angle of 90° has proved effect for the complete, gripper-like intake of a high viscosity, foamy, cohesive and also partly irregularly running product strand from the evaporator outlet. The product strand may also escape laterally and it then passes into the region of the upper screws 1 and 4 where it is again caught up in a controlled manner and drawn in. The mouth opening of the evaporator tube 6 may be varied in height above the tank 5 in accordance with the product requirements. A housing 9 in the lower part of the separating tank 5 forms a half-sided regular octagon corresponding to the geometrical arrangement of the screw shafts 1 to 4. The casing 10 of the housing 9 may be heated. The upper part 11 of the wall 5 is conical.

Figure 4:
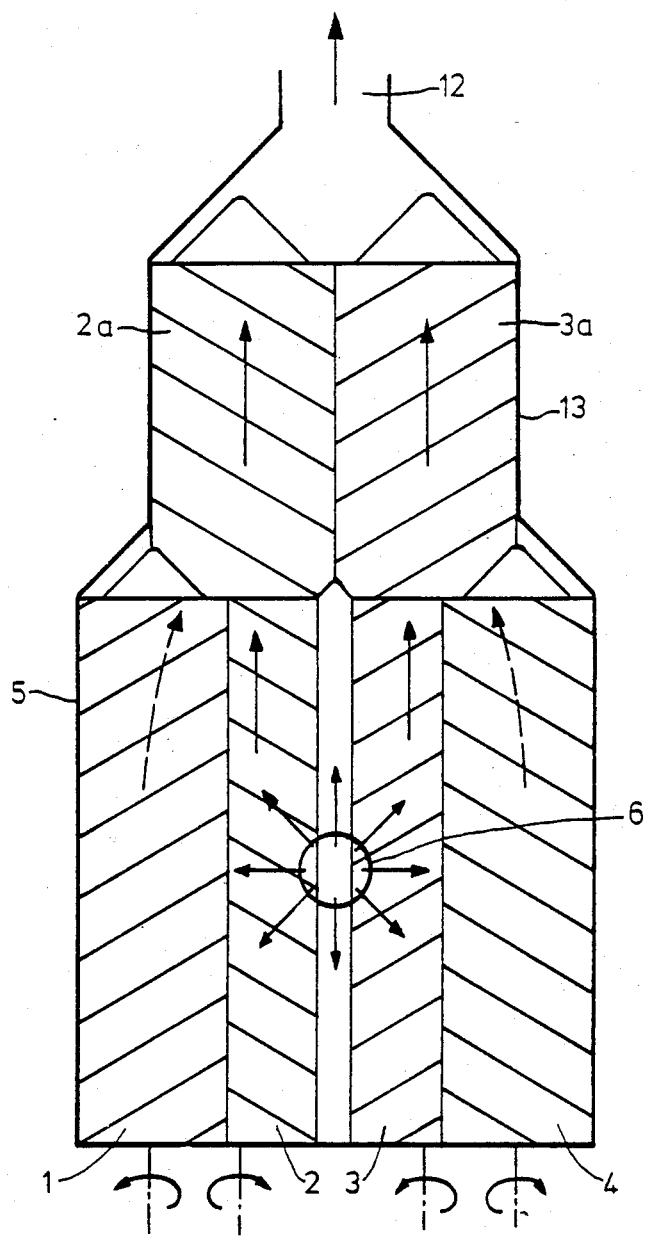
FIG. 4 illustrates a top view of the discharge apparatus according to FIG. 3.

It may be seen from FIG. 4 that the two lower screw shafts 2 and 3 do not engage with each other, but are arranged with a gap or tangentially with respect to a gripper-like draw-in behaviour. They are cleaned by the two upper screws 1 and 4. Moreover, the two lower screw shafts 2 and 3 are elongated in an axial direction. Thus, the four-shaft draw-in geometry only exists in the region of the collection zone (FIG. 3). In the region of the discharge and pressure build-up zone, the two lower screw shafts 2 and 3 are continued as engaging contra-rotating screws 2a, 3a having a greater ratio of external diameter to core diameter. Therefore, a double shaft screw pump (2a, 3a) is connected downstream of the four-shaft screw pump in the collection region (FIG. 3) as a pressure build-up zone, the two centre screws of the separating zone merging equiaxially into the screws of the pressure build-up zone. In this manner, a highly effective collection may be achieved, and a high pressure may simultaneously be built up at the outlet 12 using a single apparatus. Since the two upper screws 1 and 4 are omitted in the pressure build-up zone, the housing dimensions are reduced accordingly. Therefore, it is possible to distinguish between a collecting housing 5 (or 11 and 9 respectively) and a pressure build-up housing 13 (see FIG. 4). A motor is connected to one or both lower screw shafts 2 and 3 as the drive for the discharge apparatus. The screw shafts which are not directly driven from outside are then also driven via the contrarotation engagement in the product chamber. A simple four-contrarotation drive is also possible, at no considerable expense, for the separate drive of all the screw shafts.

The operation may be described in the following manner. In the case of comparatively small throughputs, the high viscosity strand 7 of concentrate is completely drawn-in by the two lower screw shafts 2 and 3. In the case of larger throughputs, the main proportion is also drawn in centrally, while smaller proportions which arrive on the upper screw shaft 1 and 4 are carried outwards in accordance with their rotational direction and are drawn into the intake pockets between the screws and the wall 5. Thus, in the case of large throughputs, the two meshing pairs of shafts 1-2 and 3-4 divide the concentrate flow into three partial flows, as a result of which an additional release of vapour is facilitated from the high viscosity foam and the concentrate strand is dissected and spread out flat.

In the case of a very irregular pulsating evaporation (spraying), the walls of the collection chamber above the screw shafts 1 to 4 may be cooled so slightly that they are covered with a thin film of condensate 14. This condensate film is adjusted so marginally above the cooling temperature that it spontaneously evaporates in the heated part 9 of the separating tank.

In conclusion, it will again be pointed out that the new discharge apparatus may be universally applied to solving problems which arise due to the coupling of two successive procedural stages in high viscosity technology.

References

[1] DAS 1 964 949 of 24.12.1969
[2] DAS 1 964 946 of 24.12.1969
[3] H. Herrmann: Schneckenmaschinen in der Verfahrenstechnik, Springer-Verlag 1972, P. 154–157
[4] US 3 395 746 of 13.12.1965
[5] US 3 280 886 of 24.8.1965

We claim:

1. An apparatus for collecting and discharging high viscosity strands comprising a multi-shaft screw pump including a collection tank, a group of at least four screw shafts arranged at the bottom of the collection tank in generally parallel relationship to one another, a circumferential portion of the shafts being confined by the collection tank with the remaining circumferential portion of the shafts freely exposed to open space within the tank, two adjacent shafts of the group at the bottom of the collection tank forming an inner central shaft pair with at least one shaft on each side thereof engaging one of the shaft pair, the central shaft pair extending axially beyond the collection tank into a downstream pressure build-up zone including discharge means, the pressure build-up zone having walls closely surrounding the axially extended central shaft pair, the diameter and the distance between the two central shafts arranged so that they do not intermesh in the collection tank, the axially extended central shafts having a greater diameter in the pressure build-up zone for engaging with each other, and means to rotate each shaft of the group in an opposite direction relative to an adjacent shaft in the group.

2. An apparatus for collecting and discharging high viscosity strands as in claim 1, wherein the axis of each shaft of the group lies in the same plane.

3. An apparatus for collecting and discharging high viscosity strands as in claim 1, wherein the axis of each shaft of the inner central shaft pair lies in the same plane and the axes of the remaining shafts of the group lie in an elevated parallel plane to thereby form a converging collection zone.

4. An apparatus as in claim 1, wherein the two shafts of the inner central shaft pair are symmetrically positioned with respect to the remaining shafts of the group.

5. An apparatus as in claim 1 including a drive means connected to drive one shaft of the group.

6. An apparatus as in claim 2 wherein the drive means is connected to one of the inner central shaft pair.

7. An apparatus as in claim 1 including a drive means connected to drive both shafts of the inner central shaft pair.

* * * * *